(12) United States Patent
Mohan et al.

(10) Patent No.: US 8,761,068 B2
(45) Date of Patent: Jun. 24, 2014

(54) SUPPORTING DL TRIGGERED HS-DPCHH IN A CELL IN CELL_FACH

(75) Inventors: Siddharth Mohan, San Diego, CA (US); Sharad Deepak Sambhwani, San Diego, CA (US); Ravi Agarwal, San Diego, CA (US); Rohit Kapoor, San Diego, CA (US); Arjun Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 13/568,311

(22) Filed: Aug. 7, 2012

(65) Prior Publication Data
US 2013/0044663 A1    Feb. 21, 2013

Related U.S. Application Data

(60) Provisional application No. 61/523,774, filed on Aug. 15, 2011, provisional application No. 61/556,662, filed on Nov. 7, 2011, provisional application No. 61/646,150, filed on May 11, 2012.

(51) Int. Cl.
*G08C 17/00* (2006.01)
*H04W 4/00* (2009.01)
*H04W 74/08* (2009.01)

(52) U.S. Cl.
CPC ................................. *H04W 74/0858* (2013.01)
USPC .......................................... 370/311; 370/329

(58) Field of Classification Search
CPC ................................................ H04W 74/0858
USPC .................................................. 370/311, 329
See application file for complete search history.

(56) References Cited

U.S. PATENT DOCUMENTS

| | | | |
|---|---|---|---|
| 8,295,243 B2 * | 10/2012 | Malladi et al. | 370/331 |
| 8,599,706 B2 * | 12/2013 | Damnjanovic et al. | 370/252 |
| 2009/0086671 A1 | 4/2009 | Pelletier et al. | |
| 2009/0109912 A1 | 4/2009 | DiGirolamo et al. | |
| 2009/0186613 A1 | 7/2009 | Ahn et al. | |
| 2009/0201871 A1 | 8/2009 | Sambhwani et al. | |
| 2009/0247161 A1 | 10/2009 | Pani et al. | |
| 2013/0016701 A1 * | 1/2013 | Malladi et al. | 370/331 |

FOREIGN PATENT DOCUMENTS

WO    2012139955 A1    10/2012

OTHER PUBLICATIONS

Huawei et al, "consideration on HS-DPCCH feedback in CELL_FACH states", 3GPP Draft; R2-113006 Consideration on HS-DPCCH Feedback in CELL_FACH State, 3rd Generation Partnership Project (3GPP), Mobile Competence Centre, May 2, 2011, pp. 1-3.*

(Continued)

*Primary Examiner* — Jung Park
*Assistant Examiner* — Albert Shih
(74) *Attorney, Agent, or Firm* — Charles Chesney

(57) ABSTRACT

Apparatus and methods are described for initiating an operating a high speed uplink channel. A user equipment may receive an order from a Node B triggering a feedback response. The user equipment may perform a physical random access channel (PRACH) procedure in response to receiving the order, and may also initiate a collision resolution procedure The user equipment may transmit a current channel quality indicator (CQI) of the user equipment on a high speed dedicated physical control channel (HS-DPCCH) prior to achieving collision resolution.

26 Claims, 9 Drawing Sheets

(56) References Cited

OTHER PUBLICATIONS

Notification of Transmittal of the International Preliminary Report on Patentability. International Preliminary Examining Authority; Nov. 7, 2013; PCT/US2012/050756.

Chapter II Demand; Response to Written Opinion under Article34; Article 34 Amendment. International Search Authority, Feb. 15, 2013, PCT/US2012/050756.

Response to Second Written Opinion. International Preliminary Examining Authority, Jan. 18, 2013, PCT/US2012/050756.

Dahlman E. et al., "3G Evolution—HSDPA and LTE for Mobile Broadband", Jan. 1, 2007, pp. 333-334, XP55085660, ISBN: 978-0-12-372533-2; Retrieved from the Internet: URL:http://books.google.de/books.

NEC, "Comparison of HS-based E-RACH resource assignment," R1-080237, 3GPP TSG-RAN WG1#51bis, Sevilla, Spain, Jan. 14-18, 2008, pp. 1-5.

Ericsson et al: "Overview of CELL_FACH enhancements", 3GPP Draft; R2-112323_CELL_FACH_REL-11, 3rd Generation Partnership Project (3GPP), Mobile Competence Centre ; 650, Route Des Lucioles ; F-06921 Sophia-Antipolis Cedex ; France, vol. RAN WG2, No. Shanghai, China; 20110411, Apr. 5, 2011, XP050494633, [retrieved on Apr. 5, 2011].

Huawei: "Analysis on CQI and HARQ feedback for Enhanced CELL_FACH state", 3GPP Draft; R2-080848 Analysis on CQI and HARQ Feedback for Enhanced CELL_FACH State, 3rd Generation Partnership Project (3GPP), Mobile Competence Centre ; 650, Route Des Lucioles ; F-06921 Sophia-Antipolis Cedex ; France, vol. RAN WG2, No. Sorrento, Italy; 20080205, Feb. 5, 2008 , XP050138663, [retrieved on Feb. 5, 2008].

Huawei et al: "Consideration on HS-DPCCH feedback in CELL_FACH state", 3GPP Draft; R2-113006 Consideration on HS-DPCCH Feedback in CELL_FACH State, 3rd Generation Partnership Project (3GPP), Mobile Competence Centre; 650, Route Des Lucioles ; F-06921 Sophia-Antipolis Cedex ; France, vol. RAN WG2, No. Barcelona, Spain; 20110509, May 2, 2011, XP050495122, [retrieved on May 2, 2011].

Interdigital Communications et al: "Considerations on standalone HS-DPCCH in CELL_FACH state", 3GPP Draft; R1-111612, 3rd Generation Partnership Project (3GPP), Mobile Competence Centre; 650, Route Des Lucioles; F-06921 Sophia-Antipolis Cedex ; France, vol. RAN WG1, No. Barcelona, Spain; 20110509, May 3, 2011, XP050491255, [retrieved on May 3, 2011].

International Search Report and Written Opinion—PCT/US2012/050756—ISA/EPO—Oct. 12, 2012.

Nokia Siemens Networks et al: "Signalling for Node B initiated uplink establishment in Cell_FACH", 3GPP Draft; R1-114145, 3rd Generation Partnership Project (3GPP), Mobile Competence Centre; 650, Route Des Lucioles ; F-06921 Sophia-Antipolis Cedex ; France, vol. RAN WG1, No. San Francisco, CA, USA; 20111114-20111118, Nov. 8, 2011, XP050562114, [retrieved on Nov. 8, 2011].

Qualcomm Incorporated: "On the PRACH access mechanism for standalone HS-DPCCH in CELL_FACH", 3GPP Draft; R1-114012_STANDALONE HS-DPCCH in CELL_FACH, 3rd Generation Partnership Project (3GPP), Mobile Competence Centre; 650, Route Des Lucioles ; F-06921 Sophia-Antipolis Cedex; France, vol. RAN WG1, No. San Francisco; 20111114-20111118, Nov. 8, 2011, XP050562044, [retrieved on Nov. 8, 2011].

* cited by examiner

SUPPORTING DL TRIGGERED HS-DPCHH IN A CELL IN CELL_FACH

CLAIM OF PRIORITY UNDER 35 U.S.C. §119

The present Application for Patent claims priority to Provisional Application No. 61/523,774 entitled "Supporting DL Triggered HS-DPCCH in a cell in CELL_FACH" filed Aug. 15, 2011, to Provisional Application No. 61/556,662 entitled "Supporting DL Triggered HS-DPCCH in a cell in CELL_FACH" filed Nov. 7, 2011, and to Provisional Application No. 61/646,150 entitled "Supporting DL Triggered HS-DPCCH in a cell in CELL_FACH" filed May 11, 2012," all of which are assigned to the assignee hereof and hereby expressly incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

These and other aspects of the invention will become more fully understood upon a review of the detailed description, which follows.

In accordance with some aspects, a method for initiating a high speed uplink channel is described herein. The method may include receiving, at a user equipment, an order on a high speed shared control channel (HS-SCCH). In response to receiving the order, a physical random access channel (PRACH) procedure may be performed. A collision resolution procedure may also be performed in response to receiving the order. A current channel quality indicator (CQI) of the user equipment may be transmitted on a high speed dedicated physical control channel (HS-DPCCH) prior to achieving a collision resolution result from the collision resolution procedure.

In accordance with some aspects, a computer program product for initiating a high speed uplink channel is described herein. The computer program product may include a computer-readable medium that includes at least one instruction operable to cause a computer at a user equipment to receive an order on an HS-SCCH. The computer readable medium may also include at least one instruction operable to cause the computer to perform a PRACH procedure in response to receiving the order, and at least one instruction operable to cause the computer to transmit a current CQI of the use equipment on an HS-DPCCH prior to achieving a collision resolution result from the collision resolution procedure.

In accordance with some aspects, a user equipment apparatus for initiating a high speed uplink channel is described herein. The user equipment apparatus may include means for receiving an order on an HS-SCCH, means for performing a PRACH procedure in response to receiving the order, means for performing a collision resolution procedure in response to the receiving of the order, and means for transmitting a current CQI of the user equipment on an HS-DPCCH prior to achieving a collision resolution result from the collision resolution procedure.

In accordance with some aspects, a user equipment apparatus for initiating a high speed uplink channel is described herein that includes a receiving for receiving an order on an HS-SCCH, a processor for performing a PRACH procedure and a collision resolution procedure in response to receiving the order, and a transmitter for transmitting a current CQI of the user equipment on an HS-DPCCH prior to achieving a collision resolution result from the collision resolution procedure.

In accordance with some aspects, a method for operating a high speed uplink channel is described herein. The method may include receiving, at a user equipment, an order on an HS-SCCH from a Node B. The order may include an indicator to start an uplink transmission. In response to the order, a timer having a known amount of time relative to the Node B may be started. A current CQI of the user equipment may be transmitted on an HS-DPCCH in response to the order. A determination of the expiration of the timer may be made, and transmission on the HS-DPCCH may be stopped in response to expiration of the timer.

In accordance with some aspects, a computer program product for operating a high speed uplink channel is described herein. The computer program product may include a computer-readable medium that includes at least on instruction operable to cause a computer at a user equipment to receive an order on an HS-SCCH from a Node B. The order may include an indicator to start an uplink transmission. At least one instruction operable to cause the computer to start a timer having a known amount of time relative to the Node B may also be included. The computer-readable medium may additionally include at least one instruction operable to cause the computer to transmit a current CQI of the user equipment may be transmitted on an HS-DPCCH in response to the order. A determination of the expiration of the timer may be made, and transmission on the HS-DPCCH may be stopped in response to expiration of the timer.

In accordance with some aspects, a user equipment apparatus is described herein the includes means for receiving, at a user equipment, an order on an HS-SCCH from a Node B, wherein the order includes an indicator to start an uplink transmission, means for starting a timer having a known amount of time relative to the Node B in response to decoding the order, means for transmitting a current CQI of the user equipment on an HS-DPCCH in response to the order, means for determining an expiration of the timer, and means for stopping transmission on the HS-DPCCH in response to the expiration of the timer.

In accordance with some aspects, a user equipment apparatus for operating a high speed uplink channel is described herein. The user equipment may include a receiver for receiving, at a user equipment, an order on a high speed shared control channel (HS-SCCH) from a Node B, wherein the order includes an indicator to start an uplink transmission, a processor for starting a timer having a known amount of time relative to the Node B in response to decoding the order, and a transmitter for transmitting a current channel quality indicator (CQI) of the user equipment on a high speed dedicated physical control channel (HS-DPCCH) in response to the order. The processor may be further configured for determining an expiration of the timer, and for stopping transmissions on the HS-DPCCH in response to the expiration of the timer

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Methods and apparatus are described herein for initiating and operating a high speed uplink channel. Uplink transmissions may be triggered by a downlink communication, in some aspects. The trigger may be used to trigger feedback, such as a channel quality indicator (CQI) from a user equipment (UE). The UE may transmit the CQI prior to achieving collision resolution, thereby improving efficiency. In addition, a high speed dedicated physical control channel may be released by the UE upon completion of its use.

Figure 1:
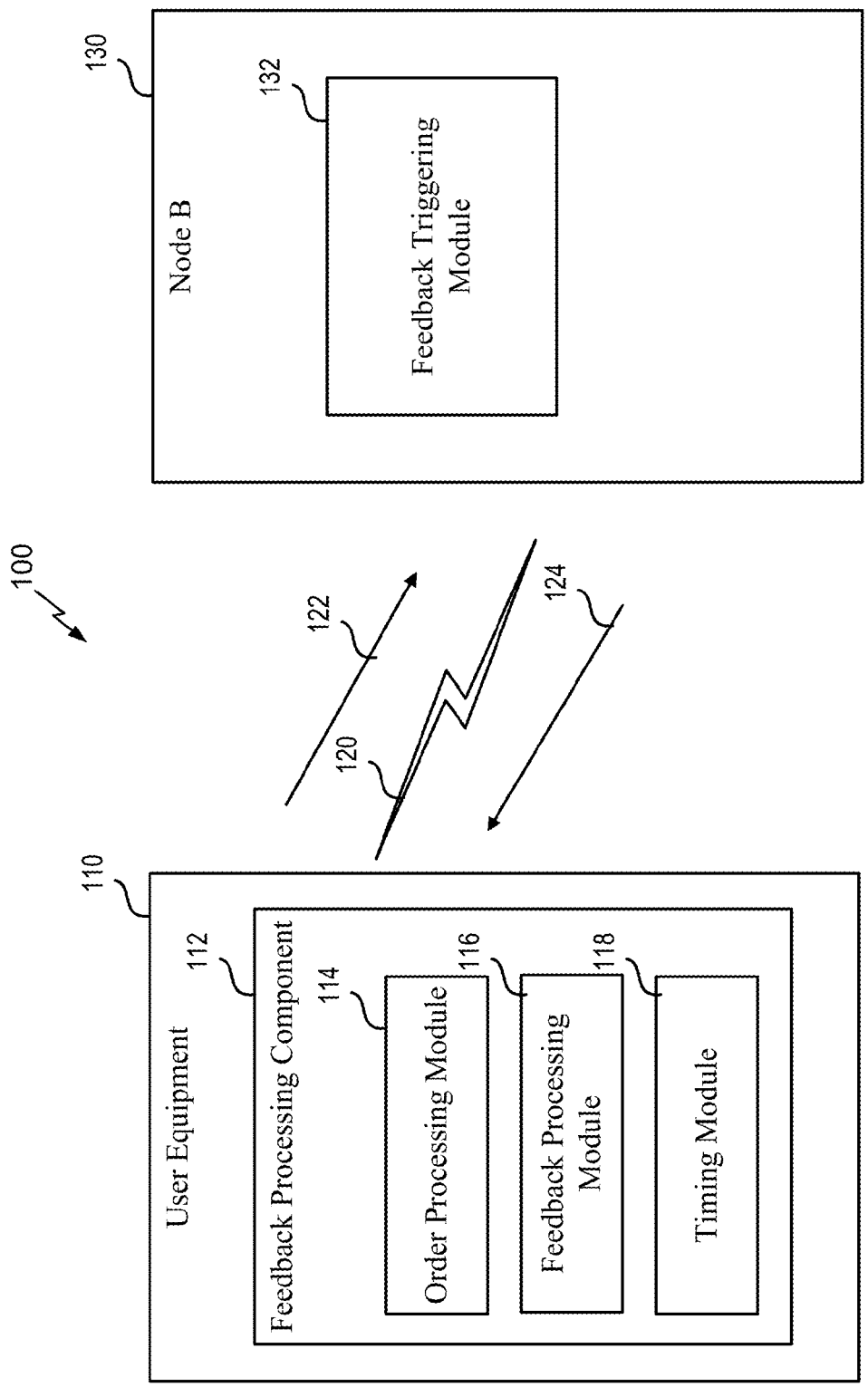
FIG. 1 is a block diagram of a wireless communications system, in accordance with some aspects.

FIG. 1 illustrates a wireless communication system 100 in which one or more of the disclosed aspects may be implemented. Wireless communication system 100 may include one or more user equipment (UE), such as UE 110, in communication with one or more Node B, such as Node B 130, via one or more communication links 120. UE 110 may be configured to transmit data to Node B 130 via uplink 122, and Node B 120 may be configured to transmit data to UE 110 via downlink 124.

Node B 130 may include a feedback triggering module 132 configured to send a message to UE 110 that triggers an uplink response. For example, the message may be an order provided on a shared control channel, such as a high speed shared control channel (HS-SCCH). The order may be, for example, a message containing configuration information for the UE. The order may include a common enhanced uplink dedicated channel (E-DCH) resource index, in some aspects. In some aspects, the order may include an indicator to start an uplink transmission. In other aspects, the order may include an access channel signature identifier and/or a signature-to-resource mapping identifier. UE 110 may use the information included in the order to acquire an uplink channel for transmitting the uplink response.

UE 110 may include a feedback processing component 112, which may include an order processing module 114, a feedback processing module 116, and a timing module 118, among other elements. Order processing module 114 may be configured to receive and process orders received from Node B 130 to trigger an uplink response from UE 110. For example, in some aspects, order processing module 114 may be configured to transmit a packet having an identifier in response to receiving an order, the identifier being provided to avoid confusion at Node B 130 with other UEs performing a physical random access channel (PRACH) procedure. In some aspects, the identifier may include an E-DCH Radio Network Temporary Identifier (E-RNTI) associated with the UE. Transmitting the E-RNTI may trigger the Node B to associate UE 110 with an HS-DSCH RNTI (H-RNTI). The order processing module 114 may also transmit a Scheduling Information (SI) RNTI with the E-RNTI in a MAC i-header. In some aspects order processing module 114 may be configured to transmit the one or more identifiers even when UE 110 has no data to transmit.

In some aspects, where the order from Node B 130 includes an access channel signature identifier and a signature-to-resource mapping identifier, order processing module 114 may be configured to receive a PRACH identifier, and may use the signature-to-resource mapping identifier to map the PRACH signature identifier to one or more default uplink resources. Order processing module 114 may also be configured to receive and process ACKs and NAKs on an acquisition indicator channel.

Feedback processing module 116 may be configured to provide an uplink response to the Node B 130. For example, the feedback processing module 116 may be configured to provide channel quality indicator (CQI) data to Node B 130. The feedback processing module 116 may be configured to analyze one or more resources of one or more signals received by UE 110 and determine interference, packet loss, scattering, or noise data related to such signals/resource, and to provide such data as CQI data to Node B 130. The feedback processing module 116 may be configured to transmit the CQI data and/or other data before a collision resolution is achieved. For example, the feedback processing module 116 may be configured to transmit the CQI data and/or other data upon completion of a PRACH procedure.

As shown in FIG. 1, UE 110 may also include a timing module 118, in accordance with some aspects. HS-DPCCH transmissions may be explicitly or implicitly terminated. For example, a Node B may explicitly release the uplink resource at any point by sending an explicit release (e.g., via an E-DCH-Absolute Grant Channel (E-AGCH)). After receiving an explicit release of the uplink resource instruction from the Node B, timing module 118 may cause the UE to immediately enter an OFF period in its discontinuous reception (DRX) cycle. One or more timers may also be used to trigger the termination of downlink triggered transmissions on the HS-DPCCH.

Timing module 118 may be configured to start a first timer set to a known amount of time relative to the Node B in response to decoding an order. In some aspects, the timer may be started upon the start of an uplink DPCCH or HS-DPCCH transmission upon decoding the order. In some aspects, timing module 118 may be configured to reset the first timer if any MAC PDU is received or if the total E-DCH buffer status (TEBS) is not equal to zero while the timer is running Once the first timer has expired, the TEBS may be reported to the Node B MAC, an inactivity timer (referred to herein as T321) may be started, and uplink transmissions may be stopped.

Figure 2:
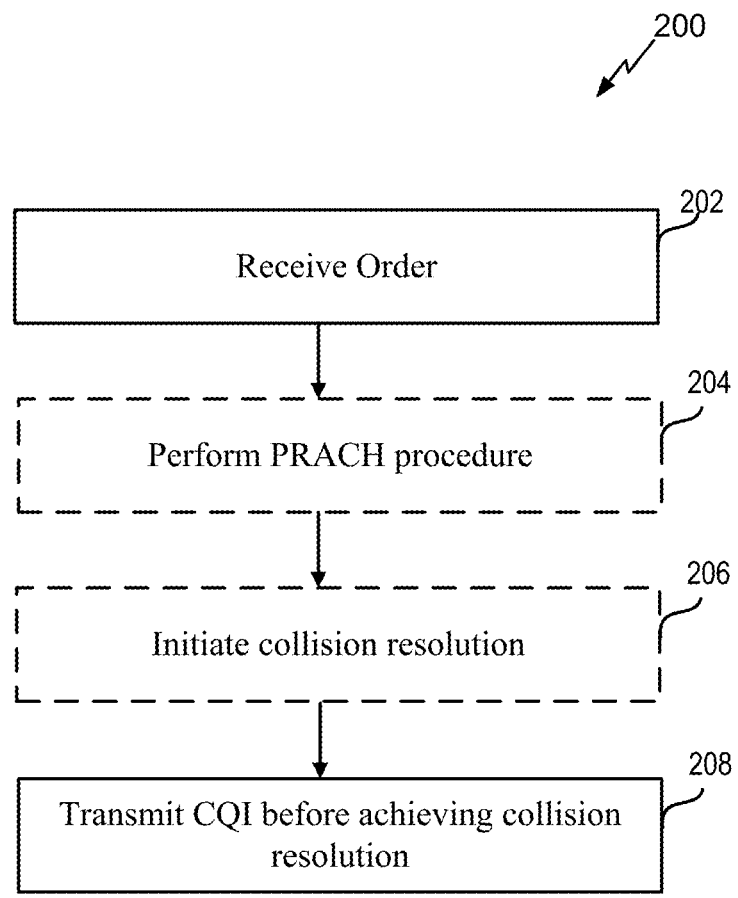
FIG. 2 is a flowchart depicting a method for initiating a high speed uplink channel, in accordance with some aspects.

FIG. 2 illustrates a method 200 for initiating a high speed uplink channel. In some aspects, method 200 may be performed by UE 110. As shown at 202, a UE may receive an order on a HS-SCCH from a Node B. The order may trigger UE 110 to provide feedback information. In some aspects, the order may include an enhanced uplink dedicated channel (E-DCH) resource index. In some aspects, the order may include a start uplink message. In some aspects, the order may include an access channel signature and/or a signature-to-resource mapping identifier. As shown at 204, the UE may perform a PRACH procedure in response to receiving the order. As shown at 206, the UE may also initiate a collision resolution procedure upon receipt of the order, in some aspects. For example, when the order does not include an E-DCH resource index, the UE may be configured to perform collision resolution. In some aspects, when the order includes the E-DCH resource index, collision resolution can be skipped. As shown at 208, UE 110 may transmit CQI data of the UE on a HS-DPCCH before achieving a collision resolution. In some aspects, the CQI data may be transmitted upon completion of the PRACH procedure that begins at 204.

Figure 3:
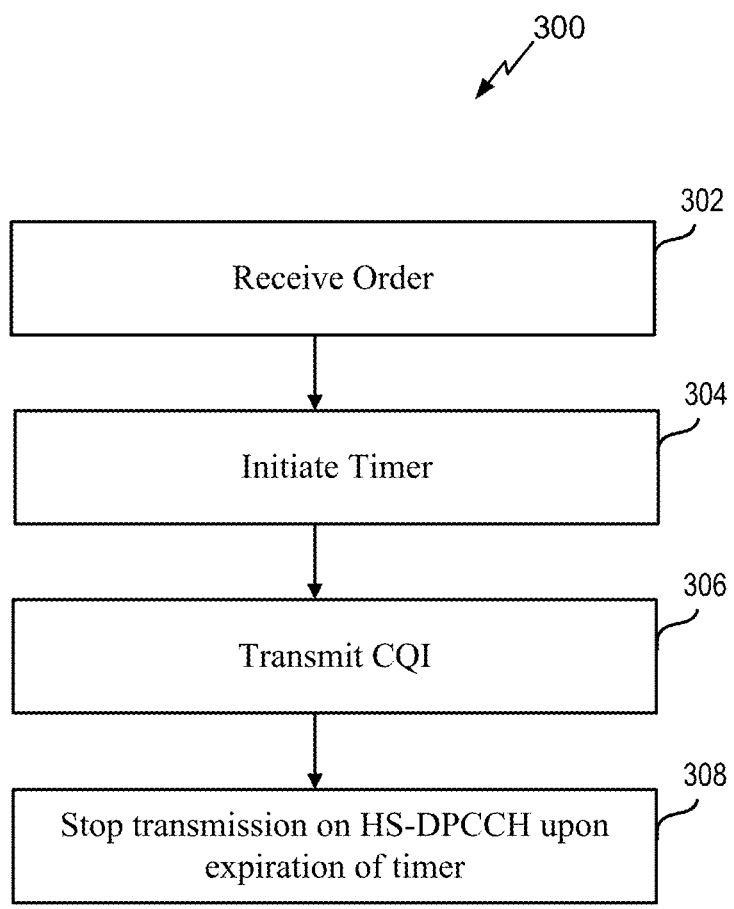
FIG. 3 is a flowchart depicting a method for operating a high speed uplink channel, in accordance with some aspects.

FIG. 3 depicts a method 300 for operating a high speed uplink channel. In some aspects, method 300 may be performed by UE 110. As shown at 302, the UE may receive an order on a HS-SCCH including an indicator to start an uplink transmission. As shown at 304, the UE may start a timer having a known amount of time relative to the Node B in response to decoding the order. As shown at 306, the UE may transmit a current CQI of the UE on a HS-DPCCH in response to the order. Upon determination that the timer has expired, the UE may stop transmissions on the HS-DPCCH, as shown at 308.

Figure 4:
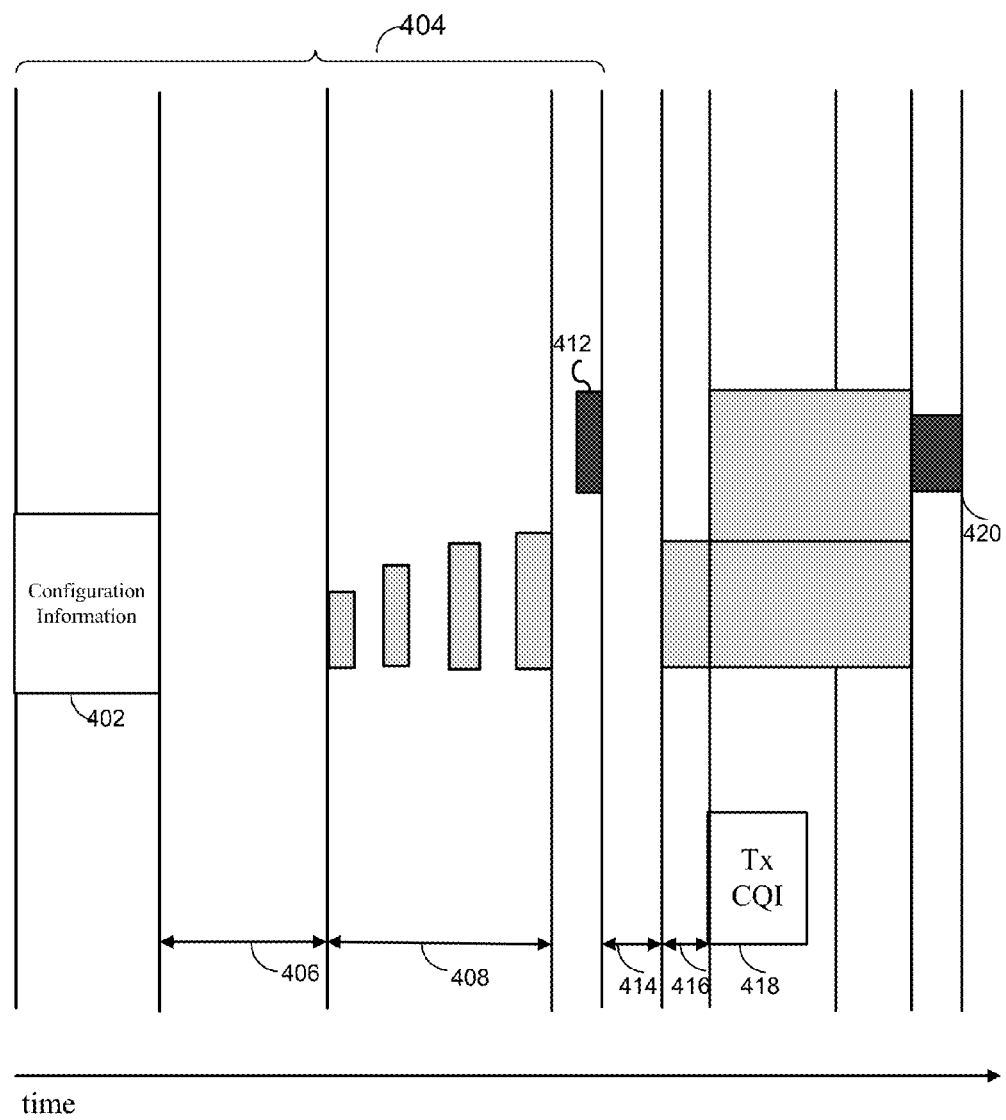
FIG. 4 is a timing diagram illustrating feedback information transmission, in accordance with some aspects.

FIG. 4 is a timing diagram illustrating steps that a UE may execute to perform a PRACH procedure and CQI transmission. As shown at 402, the UE may receive configuration information on a trigger channel. For example, the UE may receive an order, such as an HS-SCCH order, on the HS-SCCH. The UE commences and performs the PRACH procedure, as shown at 404. The UE may wait for an access slot, as shown at 406, and when an access slot becomes available, may begin transmitting PRACH preambles on the PRACH during a preamble transmission period, as shown at 408. After a defined number of preambles, such as four preambles in this example, the UE may wait for an acknowledgement of the preambles from the Node B.

As shown at 412, the UE may receive an acquisition indicator (AI) on an Acquisition Indicator Channel (AICH) from the Node B, which may serve as an acknowledgement of the preambles. As shown at 414, the UE starts a wait period for transmitting the DPCCH. This is followed by a mandatory DPCCH only transmission period, as shown at 416. An E-DCH backoff period may occur during the DPCCH only transmission period. Upon completion of the DPCCH only period, the UE may transmit the CQI over the HS-DPCCH. In accordance with some aspects, the configuration information that the UE received on the trigger channel (e.g., the HS-SCCH channel) may indicate a common E-DCH resource. In this case, collision resolution can be avoided, and the UE may transmit the CQI over the HS-DPCCH at 418. In some aspects, the trigger channel may not indicate the common E-DCH resource. In this case, the UE may perform collision resolution. However, in accordance with some aspects, the UE may still transmit the CQI at 418, prior to the end of collision resolution, which is shown at 420.

Figure 5:
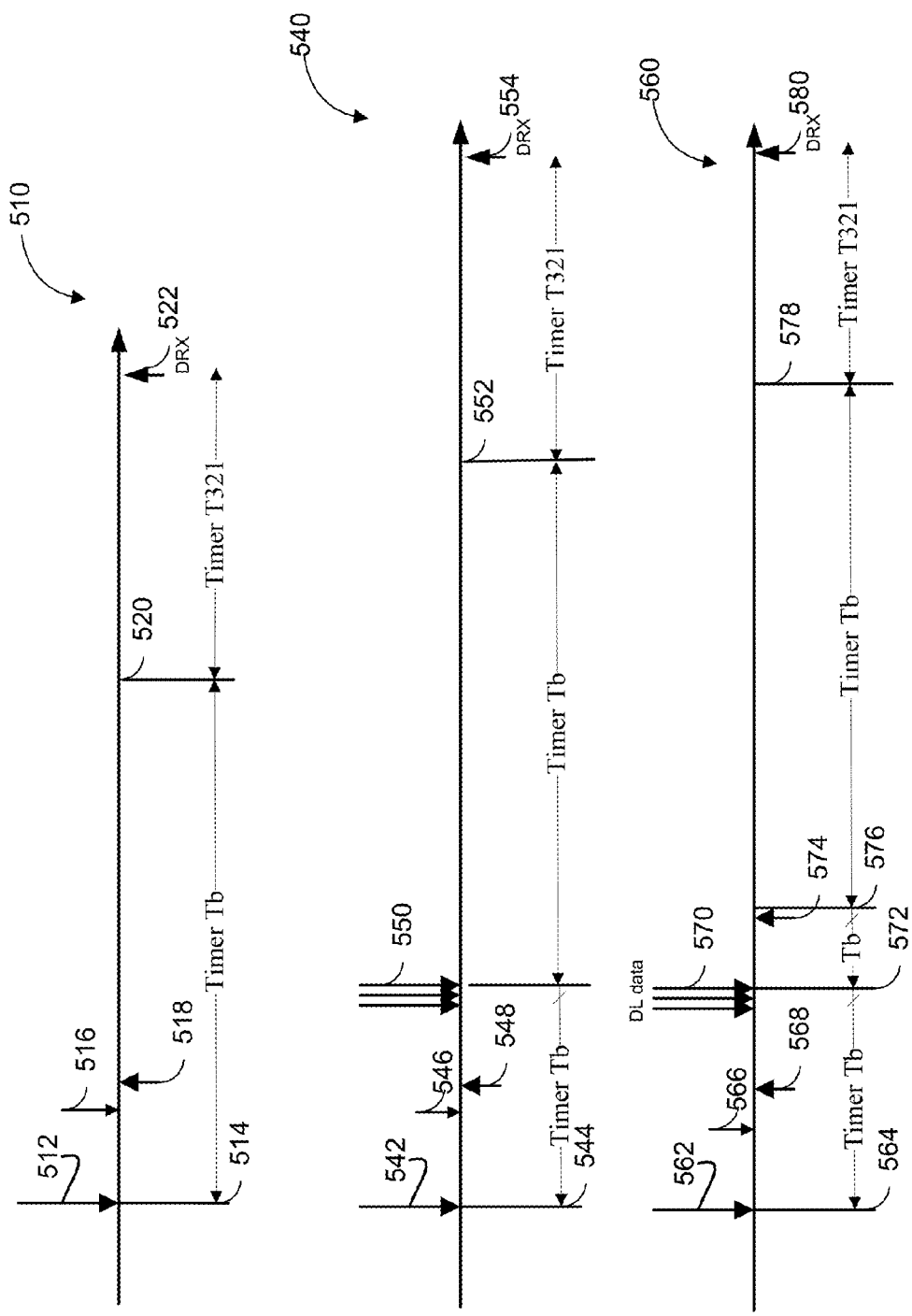
FIG. 5 depicts example timing diagrams for releasing HS-DPCCH, in accordance with some aspects.

FIG. 5 illustrates three use cases for implicit release of an HS-DPCCH. In the first example 510, the UE receives a trigger to start transmitting HS-DPCCH at 512. For example, when a Node B has downlink data for the UE, the Node B may send a trigger to the UE to start transmission of HS-DPCCH. The UE may then start a timer, Tb, as shown at 514. In some aspects, the UE may alternatively start the timer Tb at the start of DPCCH, shown at 516, or at the start of HS-DPCCH, shown at 518. In the illustrated example, the timer Tb expires without receiving any MAC PDUs, as shown at 520, and the UE terminates the HS-DPCCH at 520, in response to the expiration of the timer Tb. The UE may then start an inactivity timer, T321. Upon expiration of the inactivity timer T321, the UE enters DRX, as shown at 522.

In the second example 540, the UE receives a trigger to start transmitting HS-DPCCH at 542. The UE may then start a timer, Tb, as shown at 544. In some aspects, the UE may alternatively start the timer Tb at the start of DPCCH, shown at 546, or at the start of HS-DPCCH, shown at 548. At 550, the UE receives DL HS-PDSCH data, causing the UE to reset the timer. The timer Tb expires at 552, and in response the UE terminates the HS-DPCCH and starts an inactivity timer T321 Upon expiration of the timer T321, the UE enters DRX, as shown at 554.

In the third example 560, the UE receives a trigger to start transmitting HS-DPCCH at 562. The UE may then start a timer, Tb, as shown at 564. In some aspects, the timer Tb may alternatively be started at the start of DPCCH, shown at 566, or at the start of HS-DPCCH, shown at 568. The UE receives DL data at 570, causing the UE to reset timer Tb a first time, as shown at 572. As shown at 574, the UE receives UL data (i.e., data to be transmitted by the UE to the Node B) causing the timer Tb to be reset a second time, as shown at 576. The timer Tb expires at 578, and the UE starts an inactivity timer T321. The UE stops the HS-DPCCH at 578, upon expiration of the timer Tb. The UE enters DRX, as shown at 580.

Figure 6:
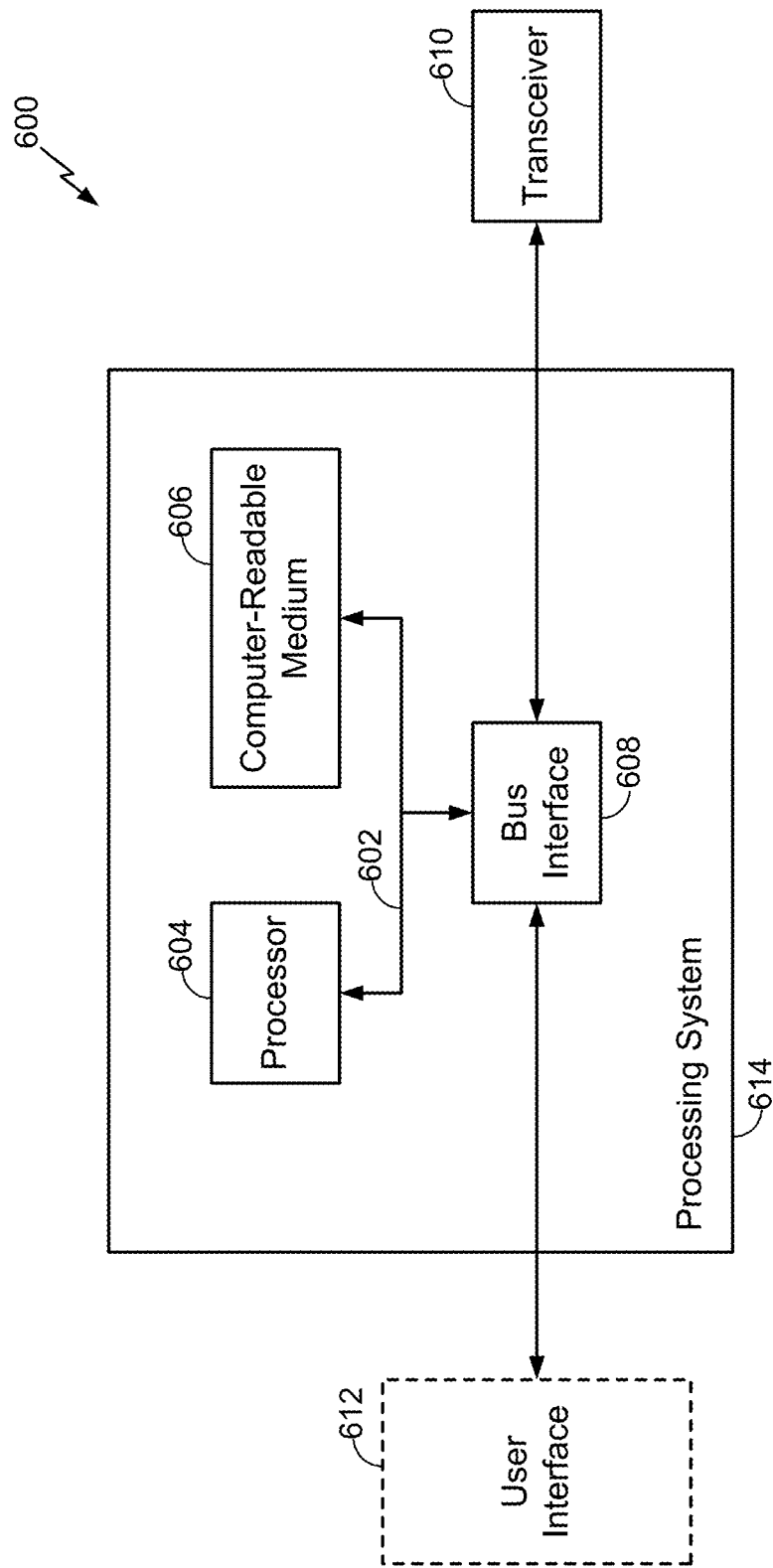
FIG. 6 is a block diagram illustrating an example of a hardware implementation for an apparatus employing a processing system.

FIG. 6 is a conceptual diagram illustrating an example of a hardware implementation for an apparatus 600 employing a processing system 614 that is specially configured with components and/or programmed with instructions to perform one or more of the functions described herein, such as for UE 110 (FIG. 1) or Node B 130 (FIG. 1). In this example, the processing system 614 may be implemented with a bus architecture, represented generally by the bus 602. The bus 602 may include any number of interconnecting buses and bridges depending on the specific application of the processing system 614 and the overall design constraints. The bus 102 links together various circuits including one or more processors, represented generally by the processor 604, and computer-readable media, represented generally by the computer-readable medium 606. The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. Computer-readable medium 606 may be, for example, volatile or non-volatile storage, such as, for example, Read-only memory (ROM), random access memory (RAM), optical disk, non-volatile RAM (e.g., flash memory), magnetic storage etc.

The computer-readable medium 606 can store feedback triggering module 132 for the Node B 130 or the feedback processing component 112 for the UE 110 (FIG. 1).

Figure 7:
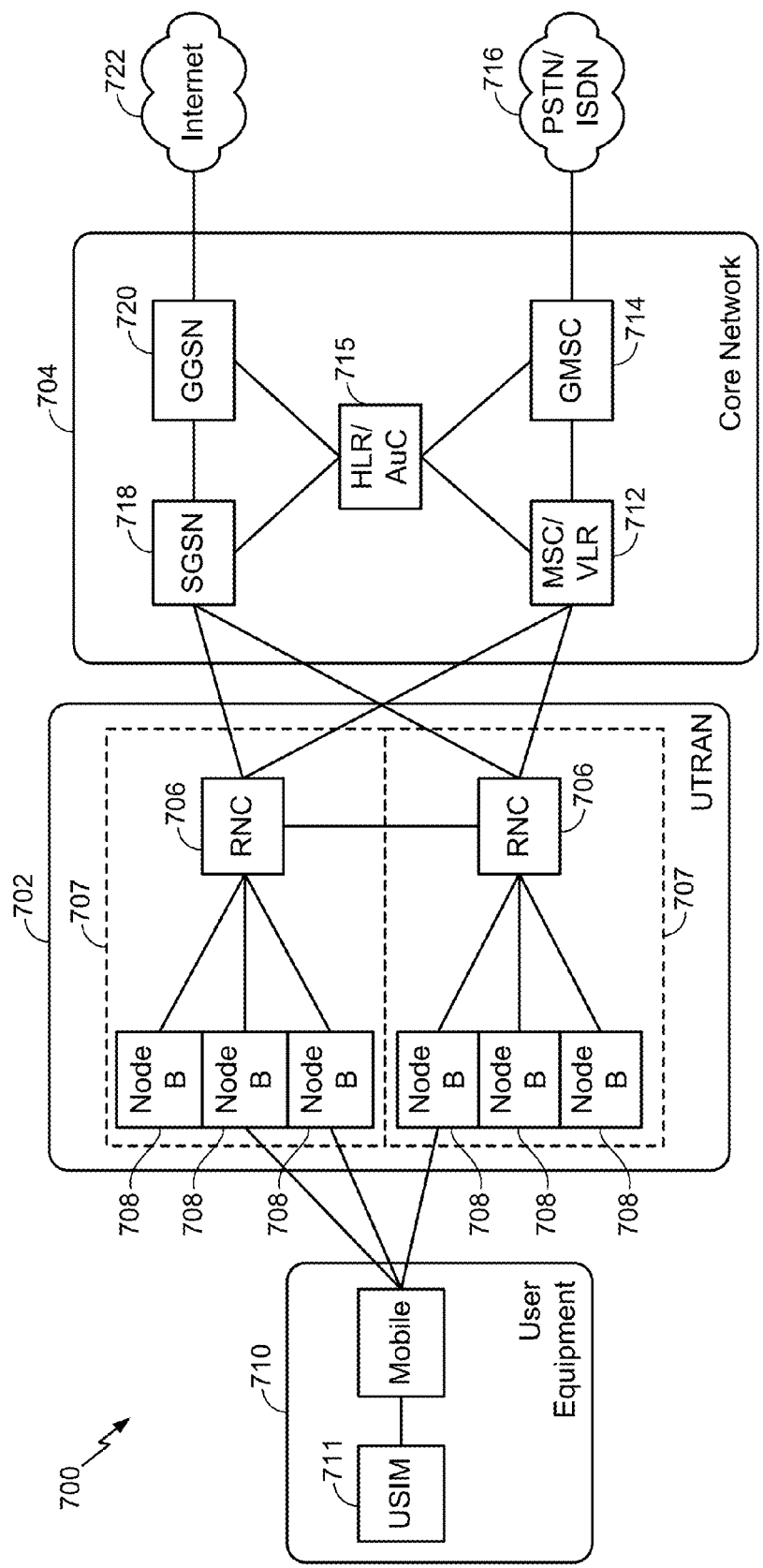
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710, which may be apparatus 110 of FIG. 1 or which may include the processing system 614 of FIG. 6. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 806 and RNSs 807 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each SRNS 707; however, the SRNSs 707 may include any number of wireless Node Bs. The Node Bs 708 provide wireless access points to a core network (CN) 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The downlink (DL), also called the forward link, refers to the communication link from a Node B 708 to a UE 710, and the uplink (UL), also called the reverse link, refers to the communication link from a UE 710 to a Node B 708.

The core network 704 interfaces with one or more access networks, such as the UTRAN 702. As shown, the core network 704 is a GSM core network. However, as those skilled in the art will recognize, the various concepts presented throughout this disclosure may be implemented in a RAN, or other suitable access network, to provide UEs with access to types of core networks other than GSM networks.

The core network 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The core network 704 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 708 and a UE 710. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
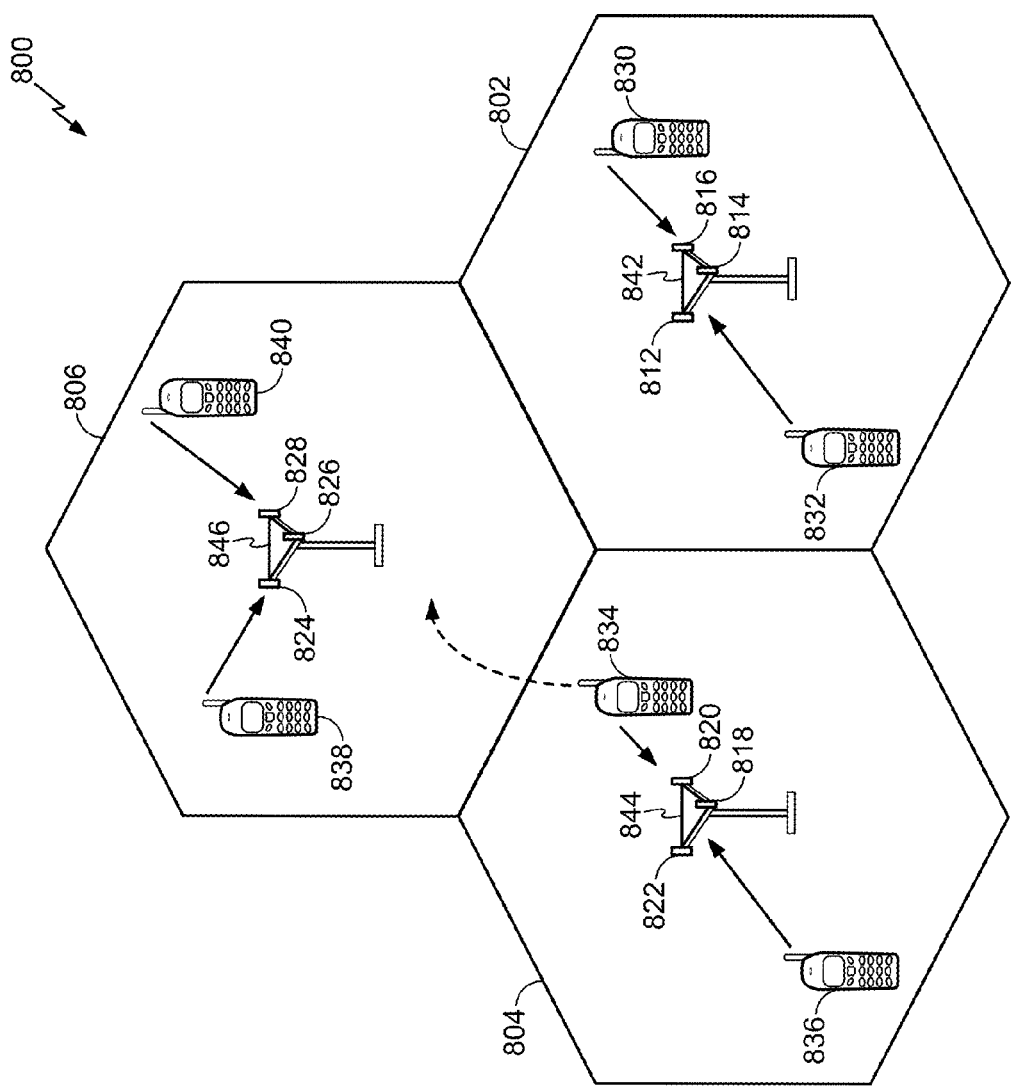
FIG. 8 is a conceptual diagram illustrating an example of an access network.

Referring to FIG. 8, an access network 800 in a UTRAN architecture is illustrated. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For instance, one or more of the UEs may be the apparatus 110 of FIG. 1 or may employ the processing system 614 of FIG. 6. For example, UEs 830 and 832 may be in communication with Node B 842, UEs 834 and 836 may be in communication with Node B 844, and UEs 838 and 840 can be in communication with Node B 846. Here, each Node B 842, 844, 846 is configured to provide an access point to a core network 704 (see FIG. 7) for all the UEs 830, 832, 834, 836, 838, 840 in the respective cells 802, 804, and 806.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
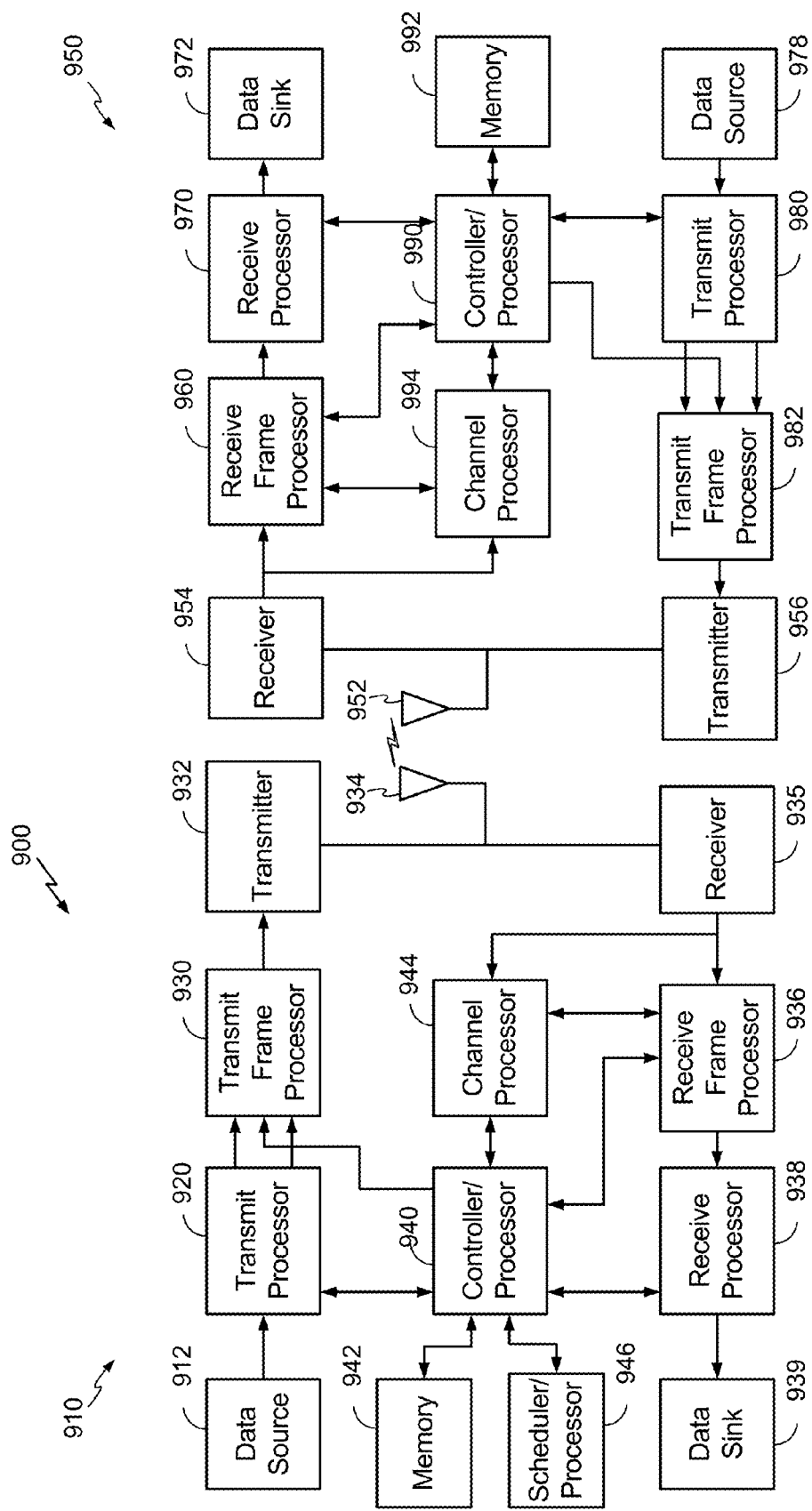
FIG. 9 is a block diagram conceptually illustrating an example of a Node B in communication with a UE in a telecommunications system.

FIG. 9 is a block diagram of a Node B 910 in communication with a UE 950, where the Node B 910 may be the Node B 708 in FIG. 7, and the UE 950 may be the UE 710 in FIG. 7 or may be the apparatus 110 of FIG. 1 and/or may employ the processing system 614 of FIG. 6. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 1030 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 1090 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 1050. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of initiating a high speed uplink channel, comprising:
   receiving, at a user equipment (UE), an order on a high speed shared control channel (HS-SCCH) from a Node B, wherein the order is configured to trigger the UE to start transmitting on a high speed dedicated physical control channel (HS-DPCCH) in CELL_FACH;
   performing a physical random access channel (PRACH) procedure in response to the receiving of the order;
   performing a collision resolution procedure in response to the receiving of the order; and
   transmitting, in response to the order, a current channel quality indicator (CQI) of the UE on the HS-DPCCH prior to achieving a collision resolution result from the collision resolution procedure.

2. The method of claim 1, further comprising:
   upon receiving the order, determining that the order includes a common enhanced uplink dedicated channel (E-DCH) resource index;
   skipping performing the collision resolution procedure in response to determining that the order includes a common E-DCH resource index; and
   transmitting the CQI upon completion of the PRACH procedure.

3. The method of claim 1, wherein the order includes a start uplink message.

4. The method of claim 1, further comprising:
   transmitting a packet having an identifier in response to receiving the order, wherein the packet with the identifier is configured to avoid confusion at the Node B with another user equipment performing the PRACH procedure.

5. The method of claim 4, wherein the identifier comprises an E-DCH Radio Network Temporary Identifier (E-RNTI) of the UE, and wherein transmitting the packet with the E-RNTI is further configured to trigger the Node B to associate the UE with an HS-DSCH Radio Network Transaction Identifier (H-RNTI).

6. The method of claim 5, wherein transmitting the packet further comprises transmitting a Scheduling Information (SI) with the E-RNTI in a media access control (MAC)-i header.

7. The method of claim 4, wherein transmitting the packet with the identifier further comprises transmitting when the user equipment has no data to transmit.

8. The method of claim 1, further comprising receiving, at the UE, an amount of data based on the CQI on a high speed physical downlink shared channel (HS-PDSCH) from the Node B.

9. The method of claim 1, wherein the order includes an access channel signature and a signature-to-resource mapping identifier, and
   wherein the PRACH procedure is performed according to the access channel signature identifier and the signature-to-resource mapping identifier in response to receiving the order.

10. The method of claim 1, wherein the order includes an indicator to start an uplink transmission, the method further comprising:
    starting a timer having a known amount of time relative to the Node B in response to decoding the order;
    determining an expiration of the timer; and
    stopping transmissions on the HS-DPCCH in response to the expiration of the timer.

11. The method of claim 10, further comprising setting the timer with the known amount of time, wherein the known amount of time comprises an E-DCH transmission continuation backoff value.

12. The method of claim 10, further comprising resetting the timer when a medium access control-ehs packet data unit (MAC-ehs PDU) is received or when a Total E-DCH Buffer Status (TEBS) byte has a value is greater than or less than zero while the timer is running.

13. The method of claim 10, further comprising performing the following upon the expiration of the timer:
reporting the TEBS byte having the value of zero to the Node B as Scheduling Information (SI) in a MAC-i PDU, wherein the MAC-i PDU indicates to the radio link control (RLC) layer for each logical channel that no PDUs will be transferred to the MAC layer;
starting a T 321 timer; and
entering a discontinuous reception (DRX) cycle upon expiry of the T 321 timer.

14. The method of claim 1, wherein receiving the order further comprises receiving the order when the Node B has downlink data to transmit.

15. A non-transitory computer-readable medium, comprising:
at least one instruction operable to cause a computer at a user equipment (UE) to receive an order on a high speed shared control channel (HS-SCCH) from a Node B, wherein the order is configured to trigger the UE to start transmitting on a high speed dedicated physical control channel (HS-DPCCH) in CELL_FACH;
at least one instruction operable to cause the computer to perform a physical random access channel (PRACH) procedure in response to the receiving of the order;
at least one instruction operable to cause the computer to perform a collision resolution procedure in response to the receiving of the order; and
at least one instruction operable to cause the computer to transmit, in response to the order, a current channel quality indicator (CQI) of the UE on the HS-DPCCH prior to achieving a collision resolution result from the collision resolution procedure.

16. A user equipment apparatus for initiating a high speed uplink channel, comprising:
means for receiving an order on a high speed shared control channel (HS-SCCH) from a Node B, wherein the order is configured to trigger the UE to start transmitting on a high speed dedicated physical control channel (HS-DPCCH) in CELL_FACH;
means for performing a physical random access channel (PRACH) procedure in response to the receiving of the order;
means for performing a collision resolution procedure in response to the receiving of the order; and
means for transmitting, in response to the order, a current channel quality indicator (CQI) of the UE on the DS-DPCCH prior to achieving a collision resolution result from the collision resolution procedure.

17. A user equipment (UE) apparatus for initiating a high speed uplink channel, comprising:
a receiver for receiving an order on a high speed shared control channel (HS-SCCH) from a Node B, wherein the order is configured to trigger the UE to start transmitting on a high speed dedicated physical control channel (HS-DPCCH) in $CELL_{13}$ FACH;
a processor for performing a physical random access channel (PRACH) procedure in response to the receiving of the order, and for performing a collision resolution procedure in response to the receiving of the order; and
a transmitter for transmitting, in response to the order, a current channel quality indicator (CQI) of the UE on the HS-DPCCH prior to achieving a collision resolution result from the collision resolution procedure.

18. The UE apparatus of claim 17, wherein:
the processor is further configured to determine that the order includes a common enhanced uplink channel (E-DCH) resource index, and to skip performing the collision resolution procedure in response to determining that the order includes a common E-DCH resource index, and
the transmitter is further configured to transmit the CQI upon completion of the PRACH procedure.

19. The UE apparatus of 17, wherein the order includes a start uplink message.

20. The UE of claim 17, wherein the transmitter is further configured to transmit a packet having an identifier in response to receiving the order, wherein the packet with the identifier is configured to avoid confusion at the Node B with another user equipment performing the PRACH procedure.

21. The UE apparatus of claim 20, wherein the identifier comprises an E-DCH Radio Network Temporary Identifier (E-RNTI) of the UE, and wherein the transmitter is configured to transmit the packet with the E-RNTI triggering the Node B to associate the UE with an HS-DSCH Radio Network Transaction Identifier (H-RNTI).

22. The UE apparatus of claim 21, wherein transmitting the packet further comprises transmitting a Scheduling Information (SI) with the E-RNTI in a media access control (MAC)-i header.

23. The UE of claim 17, wherein the receiver is further configured to receive an amount of data based on the CQI on a high speed physical downlink shared channel (HS-PDSCH) from the Node B.

24. The UE apparatus of claim 17, wherein the order includes an access channel signature and a signature-to-resource mapping identifier, and
wherein the PRACH procedure is performed according to the access channel signature identifier and the signature-to-resource mapping identifier in response to receiving the order.

25. The user equipment apparatus of claim 20, wherein the transmitter is further configured to transmit the packet with the identifier when the user equipment has no data to transmit.

26. The user equipment apparatus of claim 17, wherein the receiver is configured to receive the order when the Node B has downlink data to transmit.

* * * * *